(12) United States Patent
Huang et al.

(10) Patent No.: US 8,654,860 B2
(45) Date of Patent: Feb. 18, 2014

(54) APPARATUS AND METHOD FOR HIGH EFFICIENCY VIDEO CODING USING FLEXIBLE SLICE STRUCTURE

(75) Inventors: Yu-Wen Huang, Taipei (TW);
Ching-Yeh Chen, Taipei (TW);
Chih-Ming Fu, Hsinchu (TW);
Chih-Wei Hsu, Taipei (TW); Shaw-Min Lei, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 601 days.

(21) Appl. No.: 12/966,411

(22) Filed: Dec. 13, 2010

(65) Prior Publication Data

US 2012/0106652 A1     May 3, 2012

Related U.S. Application Data

(60) Provisional application No. 61/408,857, filed on Nov. 1, 2010, provisional application No. 61/410,216, filed on Nov. 4, 2010, provisional application No. 61/412,533, filed on Nov. 11, 2010.

(51) Int. Cl.
*H04N 7/26*     (2006.01)

(52) U.S. Cl.
USPC .................................. 375/240.26; 375/240.25

(58) Field of Classification Search
USPC ........................................ 375/240.25, 240.26
See application file for complete search history.

(56) References Cited

U.S. PATENT DOCUMENTS

2012/0140832 A1 * 6/2012 Sjoberg et al. ............ 375/240.26

OTHER PUBLICATIONS

Joint Collaborative Team on Video Coding (JCT-VC), documnet JCTVC-B205, 2nd Meeting: Geneva, CH, Jul. 21-28, 2010.*
TK Tan et al, entitled "Summary of HEVC working draft 1 and HEVC test model (HM)", Document: JCTVC-C405, Joint Collaborative Team on Video Coding (JCT-VC) of ITU-T SG16 WP3 and ISO/IEC JTC1/SC29/WG11, 3rd Meeting: Guangzhou, CH, Oct. 7-15, 2010.
Joint Collaborative Team, entitled "Test Model under Consideration" Document: JCTVC-B205, Joint Collaborative Team on Video Coding (JCT-VC) of ITU-T SG16 WP3 and ISO/IEC JTC1/SC29/WG11, 2nd Meeting: Geneva, CH, Jul. 21-28, 2010.

* cited by examiner

*Primary Examiner* — Sath V Perungavoor
*Assistant Examiner* — Jeffrey Williams
(74) *Attorney, Agent, or Firm* — Blairtech Solution LLC

(57) ABSTRACT

An apparatus and method for video coding based on flexible slice structure are disclosed. In the recent high efficiency video coding (HEVC) development, the slice may contain multiple LCUs instead of macroblocks. The LCU size being considered is 64×64 pixels which is much larger than the macroblock size of 16×16 pixels. Compared with the macroblock aligned slice for H.264, the LCU-aligned slice for HEVC does not provide enough granularities for dividing video frames. Consequently, a flexible slice structure is developed where slice partition is based on smaller coding units. In the flexible slice structure, the first LCU and the last LCU of the slice are allowed to be a fractional LCU, which is derived from a whole LCU using quadtree partition. Syntax elements are also developed to enable conveyance of flexible slice structure between an encoder and a decoder efficiently.

24 Claims, 24 Drawing Sheets

| seq_parameter_set_rbsp( ) { | C | Descriptor |
|---|---|---|
| ... | | |
| lcu_aligned_slice_flag | 1 | u(1) |
| if( entropy_coding_mode_flag ) { | | |
|   send_num_lcu_flag | 1 | u(1) |
|   if( !send_num_lcu_flag && !lcu_aligned_slice_flag ) { | | |
|     eos_max_depth_minus1 | 1 | ue(v) |
|     EosMinCuSize = MaxCuSize >> ( eos_max_depth_minus1 + 1 ) | | |
|     } | | |
|   } | | |
| ... | | |
| } | | |

*Fig. 6*

| slice_header( ) { | C | Descriptor |
|---|---|---|
|    first_lcu_in_slice | 2 | ue(v) |
|    FirstScuInFirstLcuIdx = 0 | | |
|    if( !lcu_aligned_slice_flag ) { | | |
|      first_scu_in_first_lcu | 2 | ue(v) |
|      FirstScuInFirstLcuIdx = first_scu_in_first_lcu | | |
|    } | | |
|    if( entropy_coding_mode_flag ) { | | |
|      if( send_num_lcu_flag ) { | | |
|         num_lcu_in_slice_minus1 | 2 | ue(v) |
|         if( !lcu_aligned_slice_flag ) { | | |
|            num_scu_in_last_lcu_minus1 | 2 | ue(v) |
|            NumScuInLastLcu = num_scu_in_last_lcu_minus1 + 1 | | |
|         } | | |
|      } | | |
|    } | | |
|    … | | |
| } | | |

*Fig. 7*

| slice_data( ) { | C | Descriptor |
|---|---|---|
|   CurrLcuAddr = first_lcu_in_slice | | |
|   FirstLcuFlag = 1 | | |
|   MoreDataFlag = 1 | | |
|   NumLcuProcessed = 0 | | |
|   do { | | |
|     CurrLcuX = HorLumaLocation( CurrLcuAddr ) | | |
|     CurrLcuY = VerLumaLocation( CurrLcuAddr ) | | |
|     CurrScuIdx = 0 | | |
|     NumScuProcessed = 0 | | |
|     if( entropy_coding_mode_flag ) { | | |
|       if( send_num_lcu_flag ) { | | |
|         LastLcuFlag = ( NumLcuProcessed == num_lcu_in_slice_minus1 ) | | |
|       } | | |
|       if( !send_num_lcu_flag && !lcu_aligned_slice_flag ) { | | |
|         last_lcu_possible_flag | 2 | ae(v) |
|       } | | |
|     } | | |
|     coding_unit( CurrLcuX, CurrLcuY, MaxCuSize ) | 2\|3\|4 | |
|     CurrLcuAddr = NextLcuAddress( CurrLcuAddr ) | | |
|     FirstLcuFlag = 0 | | |
|     NumLcuProcessed ++ | | |
|   } while( MoreDataFlag ) | | |
| } | | |

*Fig. 8*

| coding_unit( x0, y0, CurrCuSize ) { | C | Descriptor |
|---|---|---|
|   if( MoreDataFlag ) { | | |
|     if( x0+CurrCuSize <= PicWidthInSamples$_L$ &&<br>        y0+CurrCuSize <= PicHeightInSamples$_L$ ) { | | |
|       if( FirstLcuFlag && CurrScuIdx < FirstScuInFirstLcuIdx ) { | | |
|         SplitCuFlag = 1 | | |
|       } else { | | |
|         if( CurrCuSize > MinCuSize ) { | | |
|           split_coding_unit_flag | 2 | u(1)\| ae(v) |
|           SplitCuFlag = split_coding_unit_flag | | |
|         } else { | | |
|           SplitCuFlag = 0 | | |
|         } | | |
|       } | | |
|     } else { | | |
|       SplitCuFlag = 1 | | |
|     } | | |
|     if( SplitCuFlag ) { | | |
|       SplitCuSize = CurrCuSize >> 1 | | |
|       x1 = x0 + SplitCuSize | | |
|       y1 = y0 + SplitCuSize | | |
|       NumMinCuInSplitCu = ( SplitCuSize / MinCuSize )$^2$ | | |
|       NextScuIdx = CurrScuIdx + NumMinCuInSplitCu | | |
|       if( !FirstLcuFlag \|\| NextScuIdx > FirstScuInFirstLcuIdx ) { | | |
|         coding_unit( x0, y0, SplitCuSize ) | 2\|3\|4 | |
|       } else { | | |
|         CurrScuIdx += NumMinCuInSplitCu | | |
|       } | | |
|       if( x1 < PicWidthInSamples$_L$ ) { | | |
|         NextScuIdx = CurrScuIdx + NumMinCuInSplitCu | | |
|         if( !FirstLcuFlag \|\| NextScuIdx > FirstScuInFirstLcuIdx ) { | | |
|           coding_unit( x1, y0, SplitCuSize ) | 2\|3\|4 | |

*Fig. 9A*

| | | |
|---|---|---|
|       } else { | | |
|           CurrScuIdx += NumMinCuInSplitCu | | |
|       } | | |
|     } else { | | |
|       CurrScuIdx += NumMinCuInSplitCu | | |
|     } | | |
|     if( y1 < PicHeightInSamples$_L$ ) { | | |
|       NextScuIdx = CurrScuIdx + NumMinCuInSplitCu | | |
|       if( !FirstLcuFlag || NextScuIdx > FirstScuInFirstLcuIdx ) { | | |
|           coding_unit( x0, y1, SplitCuSize ) | 2\|3\|4 | |
|       } else { | | |
|           CurrScuIdx += NumMinCuInSplitCu | | |
|       } | | |
|     } else { | | |
|       CurrScuIdx += NumMinCuInSplitCu | | |
|     } | | |
|     if( x1 < PicWidthInSamples$_L$ && y1 < PicHeightInSamples$_L$ ) { | | |
|       NextScuIdx = CurrScuIdx + NumMinCuInSplitCu | | |
|       if( !FirstLcuFlag || NextScuIdx > FirstScuInFirstLcuIdx ) { | | |
|           coding_unit( x1, y1, SplitCuSize ) | 2\|3\|4 | |
|       } else { | | |
|           CurrScuIdx += NumMinCuInSplitCu | | |
|       } | | |
|     } else { | | |
|       CurrScuIdx += NumMinCuInSplitCu | | |
|     } | | |
| } else { | | |
|     NumMinCuInCurrCu = ( CurrCuSize / MinCuSize )$^2$ | | |
|     if( !FirstLcuFlag || CurrScuIdx >= FirstScuInFirstLcuIdx ) { | | |
|       prediction_unit( x0, y0, CurrCuSize ) | | |
|       if( PredMode != SKIP ) { | | |
|           transform_unit( x0, y0, CurrCuSize ) | | |

*Fig. 9B*

| | | |
|---|---|---|
| } | | |
| NumScuProcessed += NumMinCuInCurrCu | | |
| } | | |
| CurrScuIdx += NumMinCuInCurrCu | | |
| } | | |
| if( entropy_coding_mode_flag ) { | | |
|   if( lcu_aligned_slice_flag ) { | | |
|     if( CurrCuSize == MaxCuSize ) { | | |
|       if( send_num_lcu_flag ) { | | |
|         MoreDataFlag = !LastLcuFlag | | |
|       } else { | | |
|         end_of_slice_flag | 2 | ae(v) |
|         MoreDataFlag = !end_of_slice_flag | | |
|       } | | |
|     } | | |
|   } else { | | |
|     if( send_num_lcu_flag ) { | | |
|       if( LastLcuFlag ) { | | |
|         MoreDataFlag = ( NumScuProcessed < NumScuInLastLcu ) | | |
|       } | | |
|     } else { | | |
|       if( last_lcu_possible_flag && CurrCuSize >= EosMinCuSize ) { | | |
|         end_of_slice_flag | 2 | ae(v) |
|         MoreDataFlag = !end_of_slice_flag | | |
|       } | | |
|     } | | |
|   } | | |
| } else { | | |
|   MoreDataFlag = more_rbsp_data( ) | | |
| } | | |
| } | | |
| } | | |

*Fig. 9C*

| Case # → | 1 | 2 | 3 | 4 | 5 | 6 | 7 | 8 |
|---|---|---|---|---|---|---|---|---|
| CABAC (True: entropy_coding_mode_flag == 1) | F | F | F | F | T | T | T | T |
| LCU Aligned (True: lcu_aligned_slice_flag == 1) | F | T | T | T | F | F | T | T |
| Use end_of_slice_flag (True: send_num_lcu_flag == 0) | F | T | F | T | F | T | F | T |

*Fig. 10*

| 0 | 1 | 4 | 5 | 16 | 17 | 20 | 21 |
|---|---|---|---|----|----|----|----|
| 2 | 3 | 6 | 7 | 18 | 19 | 22 | 23 |
| 8 | 9 | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

*Fig. 11*

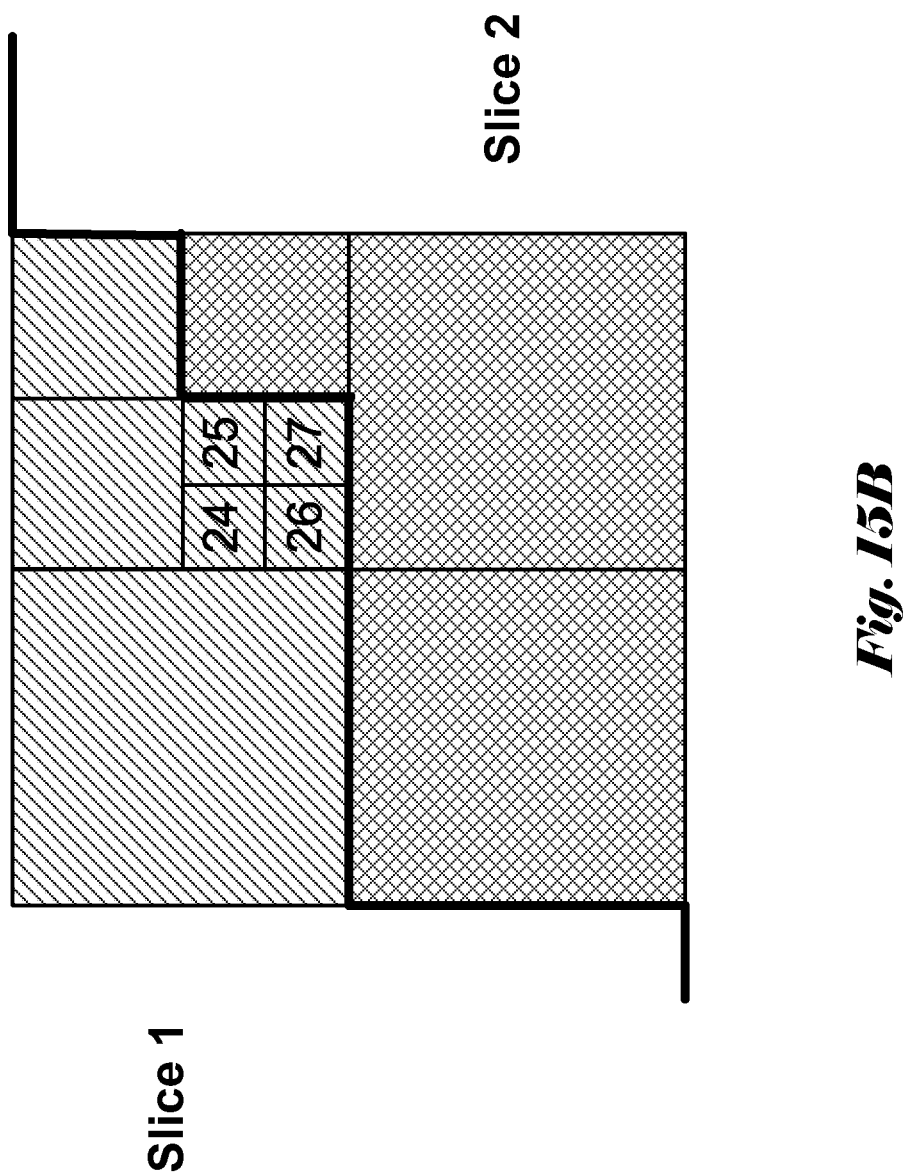

APPARATUS AND METHOD FOR HIGH EFFICIENCY VIDEO CODING USING FLEXIBLE SLICE STRUCTURE

CROSS REFERENCE TO RELATED APPLICATIONS

The present invention claims priority to U.S. Provisional Patent Application, No. 61/408,857, filed Nov. 1, 2010, entitled "Slices for High Efficiency Video Coding (HEVC)", U.S. Provisional Patent Application, No. 61/410,216, filed Nov. 4, 2010, entitled "Slices for High Efficiency Video Coding (HEVC)", and U.S. Provisional Patent Application, No. 61/412,533, filed Nov. 11, 2010, entitled "Slice and slice boundary filter for HEVC". These U.S. Provisional Patent Applications are hereby incorporated by reference in their entireties.

FIELD OF THE INVENTION

The present invention relates to video coding. In particular, the present invention relates to coding techniques associated with flexible slice structure that allows a slice to contain a fractional number of largest coding units.

BACKGROUND

For digital video compression, motion compensated inter-frame coding is a very effective compression technique and has been widely adopted in various coding standards, such as MPEG-1/2/4 and H.261/H.263/H.264/AVC. In most current coding systems, a macroblock, consisting of 16×16 pixels, is primarily used as a unit for motion estimation and subsequent processing. Nevertheless, in the recent development of the next generation standard named High Efficiency Video Coding (HEVC), a more flexible block structure is being adopted as a unit for processing. The unit of this flexible block structure is termed as coding unit (CU). The coding unit can start with a largest coding unit (LCU) and is adaptively divided into smaller blocks using a quadtree to achieve a better performance. Blocks that are no longer split into smaller coding units are called leaf CUs, and data in the same leaf CU share the same coding information. The quadtree split can be recursively applied to each of the LCUs until it reaches the smallest CU, the sizes of the LCU and the smallest CU (SCU) are properly selected to balance the tradeoff between system complexity and performance.

In the H.264 coding standard, the underlying video frames are divided into slices, where each slice consists of non-overlapping macroblocks as the smallest coding unit. Each slice can be coded as an I-slice (intra-coded slice), P-slice (predictive slice) or B-slice (bi-directional slice) and the compressed data are packed into slice-layer data. Since the slice is independently processed, errors or missing data from one slice cannot propagate to any other slice within the picture. Furthermore, redundant slices are permitted for robust transmission. In the recent HEVC development, the slice contains multiple LCUs instead of macroblocks. The LCU size being considered is 64×64 pixels which is much larger than the macroblock size of 16×16 pixels. Compared with the macroblock aligned slice for H.264, the LCU-aligned slice for HEVC does not provide enough granularities for dividing video frames. Consequently, it is very desirable to develop flexible slice structure where slice partition is based on smaller coding units and to develop mechanism to convey flexible slice structure information between an encoder and a decoder.

BRIEF SUMMARY OF THE INVENTION

An apparatus and method for video encoding using flexible slice structure are disclosed. In one embodiment according to the present invention, the apparatus and method for video coding comprise steps of partitioning video input data into largest coding units (LCUs), configuring a slice to include a plurality of LCUs, having a first LCU and a last LCU, wherein the first LCU and the last LCU are selected from a group consisting of a fractional LCU and a whole LCU and wherein the fractional LCU is formed by partitioning the whole LCU into leaf CUs according to a quadtree, applying video coding to the slice to generate compressed video data for the slice, generating a slice layer bitstream comprising the compressed video data for the slice and generating a video bitstream comprising the slice layer bitstream. Various syntax elements are incorporated into video bitstream according to the present invention to allow conveyance of the flexible slice structure between an encoder and a decoder.

An apparatus and method for video decoding using flexible slice structure are disclosed. In one embodiment according to the present invention, the apparatus and method for video decoding comprise steps of receiving a video bitstream comprising a slice layer bitstream, extracting an alignment flag from the video bitstream to determine whether a slice associated with the slice layer bitstream is largest coding unit (LCU) aligned or non-LCU-aligned, wherein the slice comprises a group of LCUs having a first LCU and a last LCU, and decoding the slice layer bitstream to provide the slice, wherein said decoding the slice layer bitstream comprises a step of deriving slice structure information in the video bitstream to determine slice boundaries. A decoder according to the present invention reconstructs a slice from the video bitstream and determines slice boundaries based on the syntax elements associated with the flexible slice structure in the video bitstream.

BRIEF DESCRIPTION OF THE DRAWINGS

FIG. 6 illustrates an exemplary sequence parameter set syntax associated with the flexible slice boundary.

FIG. 7 illustrates an exemplary slice header syntax associated with the flexible slice boundary.

FIG. 8 illustrates an exemplary slice data syntax associated with the flexible slice boundary.

FIGS. 9A-C illustrate an exemplary coding unit data syntax associated with the flexible slice boundary.

FIG. 10 illustrates all combinations related to settings of CABAC, LCU alignment, and end of slice flags for syntax design considerations.

FIG. 11 illustrates indexing of a largest coding unit according to a depth-first quadtree scan order, where the depth of the quadtree is 3.

FIG. 15B illustrates an example that the original leaf CU covering SCUs 24-27 of LCU16 in FIG. 4 is further partitioned into four leaf CUs.

DETAILED DESCRIPTION OF THE INVENTION

Video data is usually digitized into samples represented by a fixed number of bits, such as 8 bits or 10 bits per sample. For color video data, it is often represented in a selected color system such as a Red-Green-Blue (RGB) primary color coordinates or a luminance-chrominance system such as YCrCb color coordinates, where Y is referred to as the luminance component and Cr and Cb are referred to as the chrominance signals. The RGB components and the Y component are associated with the intensity of the primary colors and the luminance respectively, and their intensity is usually represented digitally in finite resolution corresponding to a non-negative integer. For example, an 8-bit data represents intensity level from 0 to 255. On the other hand, the chrominance components, Cr and Cb, are derived as a type of difference data and an 8-bit Cr/Cb data represents an integer corresponding to a level from −128 to +127.

For digital video compression, motion compensated inter-frame coding is a very effective compression technique and has been widely adopted in various coding standards, such as MPEG-1/2/4 and H.261/H.263/H.264/AVC. In most coding systems, a macroblock of 16×16 pixels is primarily used as a unit for motion estimation and subsequent processing. Nevertheless, in the recent HEVC development, a more flexible block structure is being adopted as a unit for processing which is termed as coding unit (CU). The coding process may start with a largest coding unit and then adaptively divides the coding unit into smaller blocks. The partitioning of coding units may be based on a quadtree structure to partition the coding unit into four smaller coding units of equal size. The quadtree split can be recursively applied beginning with the largest CU (LCU) until it reaches the smallest CU (SCU) where the sizes of the LCU and the SCU may be pre-specified. In order to suppress propagation of coding noise (for example, quantization errors), loop filtering has been used in various coding systems, such as the deblocking filter in H.264/AVC.

Figure 1:
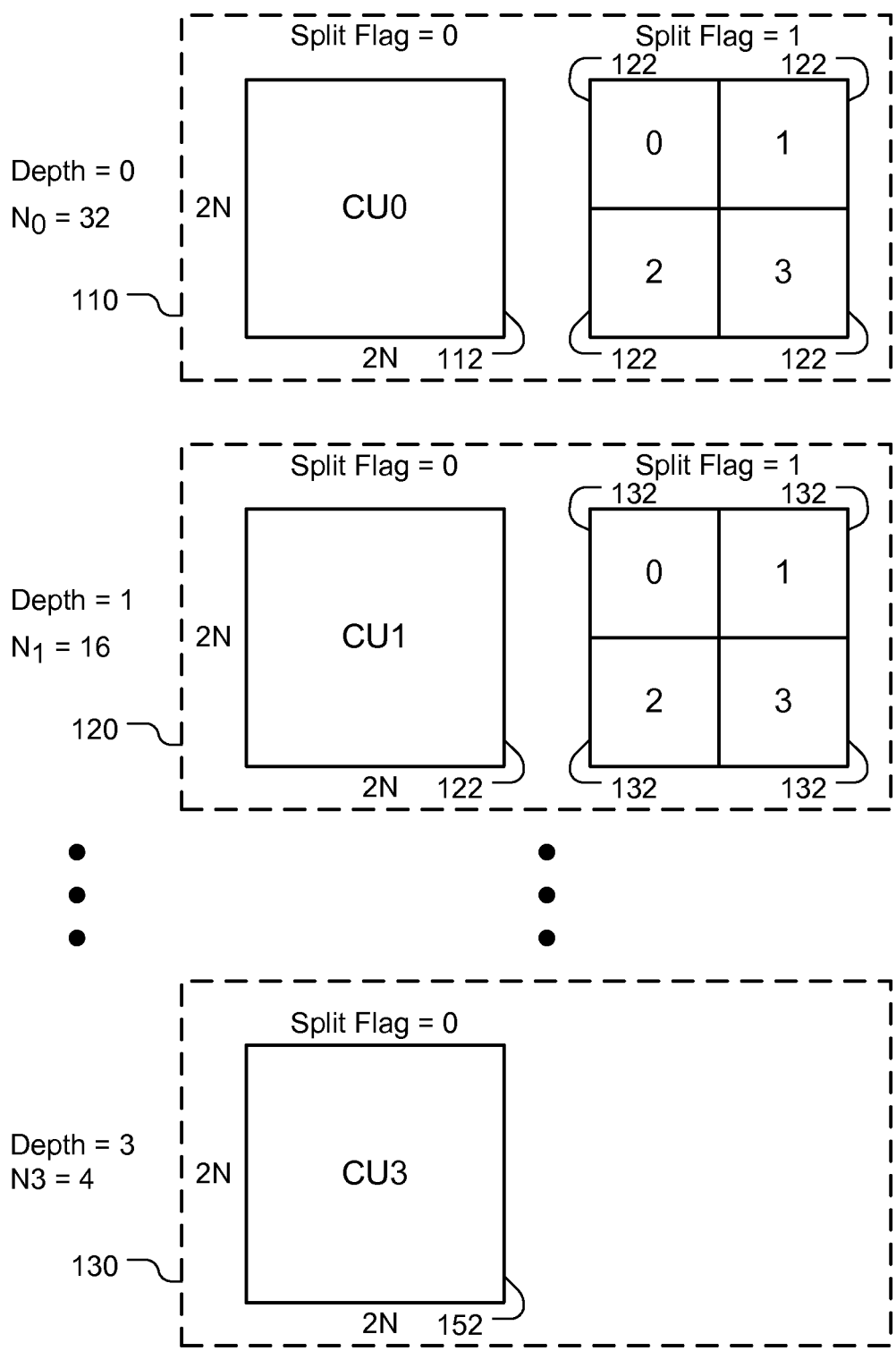
FIG. 1 illustrates an exemplary coding unit partition based on the quadtree.

FIG. 1 illustrates an exemplary coding unit partition based on a quadtree. At depth=0, the initial coding unit CU0 112 consisting of 64×64 pixel, is the largest CU. The initial coding unit CU0 112 is subject to quadtree split as shown in block 110. A split flag 0 indicates the underlying CU is not split and, on the other hand a split flag 1 indicates the underlying CU is split into four smaller coding units 122 by the quadtree. The resulting four coding units are labeled as 0, 1, 2 and 3 and each resulting coding unit becomes a coding unit for further split in the next depth. The coding units resulted from coding unit CU0 112 are referred to as CU1 122. When a coding unit is split by the quadtree, the resulting coding units are subject to further quadtree split unless the coding unit reaches a pre-specified smallest CU size. Consequently, at depth 1, the coding unit CU1 122 is subject to quadtree split as shown in block 120. Again, a split flag 0 indicates the underlying CU is not split and, on the other hand a split flag 1 indicates the underlying CU is split into four smaller coding units CU2 132 by the quadtree. The coding unit CU2 has a size of 16×16 and the process of the quadtree splitting, not shown in FIG. 1, can continue until a pre-specified smallest coding unit is reached. For example, if the smallest coding unit is chosen to be 8×8, the coding unit CU3 152 at depth 3 will not be subject to further split as shown in block 130. The collection of quadtree partitions of a picture to form variable-size coding units constitutes a partition map for the encoder to process the input image area accordingly. The partition map has to be conveyed to the decoder so that the decoding process can be performed accordingly.

Figure 2:
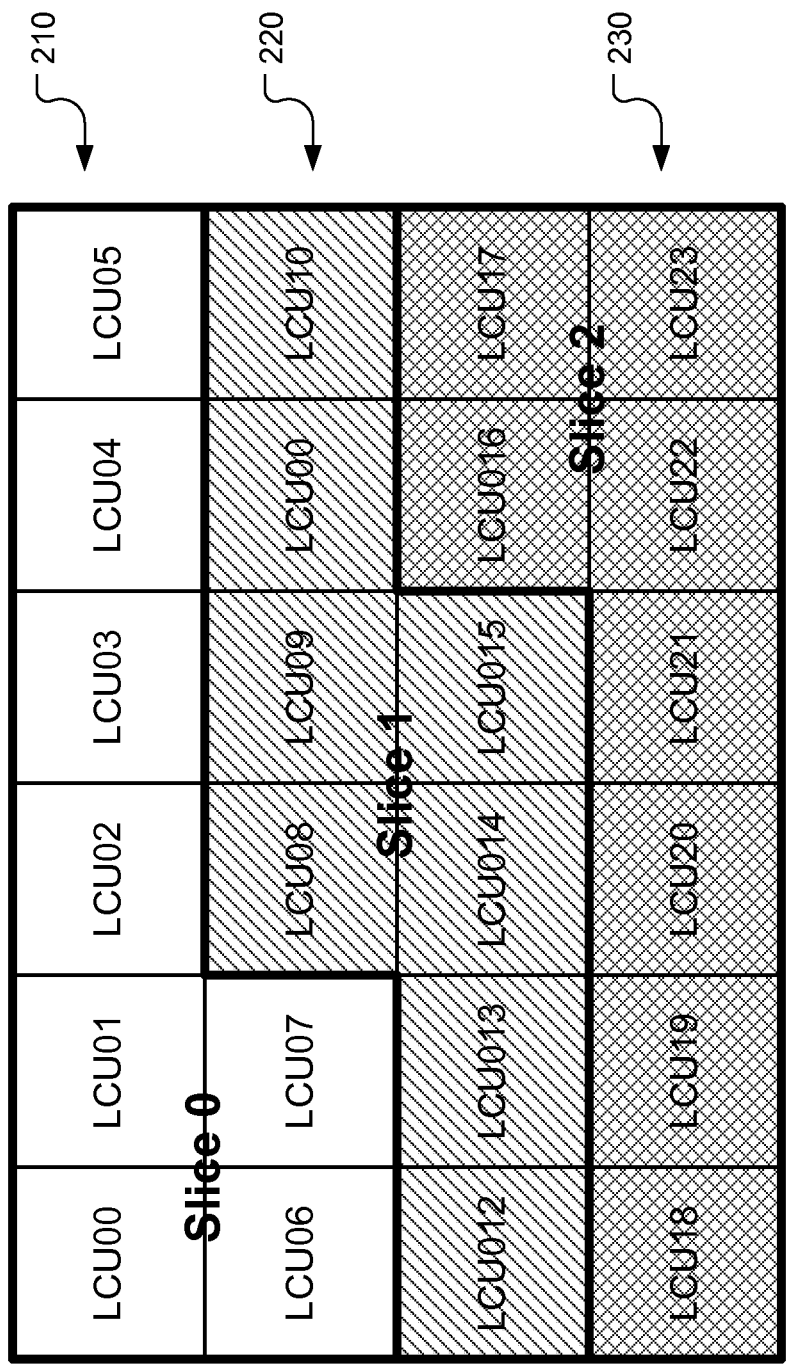
FIG. 2 illustrates an example of slice partition where the partition boundaries are aligned with largest coding unit.

In H.264 video coding standard, the underlying video frames are divided into slices, where each slice consists of non-overlapping macroblocks as the smallest coding unit. Each slice can be coded as an I-slice (intra-coded slice), P-slice (predictive slice) or B-slice (bi-directional slice) and the resulted data are packed into slice-layer data. In the high efficiency video coding (HEVC) coding standard, the largest coding unit (LCU) is used as an initial coding unit to apply video coding process. The LCU may be adaptively divided into smaller CUs for more efficient processing. The macroblock-based slice partition for H.264 can be extended to the LCU-based slice partition for HEVC. An example of the LCU-based slice partition for HEVC is shown in FIG. 2 where twenty-four LCUs are partitioned into three slices. LCU00 though LCU07 are assigned to slice 0, 210, LCU08 though LCU15 are assigned to slice 1, 220, and LCU16 though LCU23 are assigned to slice 2, 230. As shown in FIG. 2, the slice boundary is aligned with the LCU boundary. While the LCU-aligned slice partition is easy to implement, the size of LCU is much larger than the size of macroblock and the LCU-aligned slice may not be able to provide enough granularities to support dynamic environment of coding systems. Therefore, it is very desirable to be able to partition a sequence of frames into slices based on units smaller than the LCU.

Figure 3:
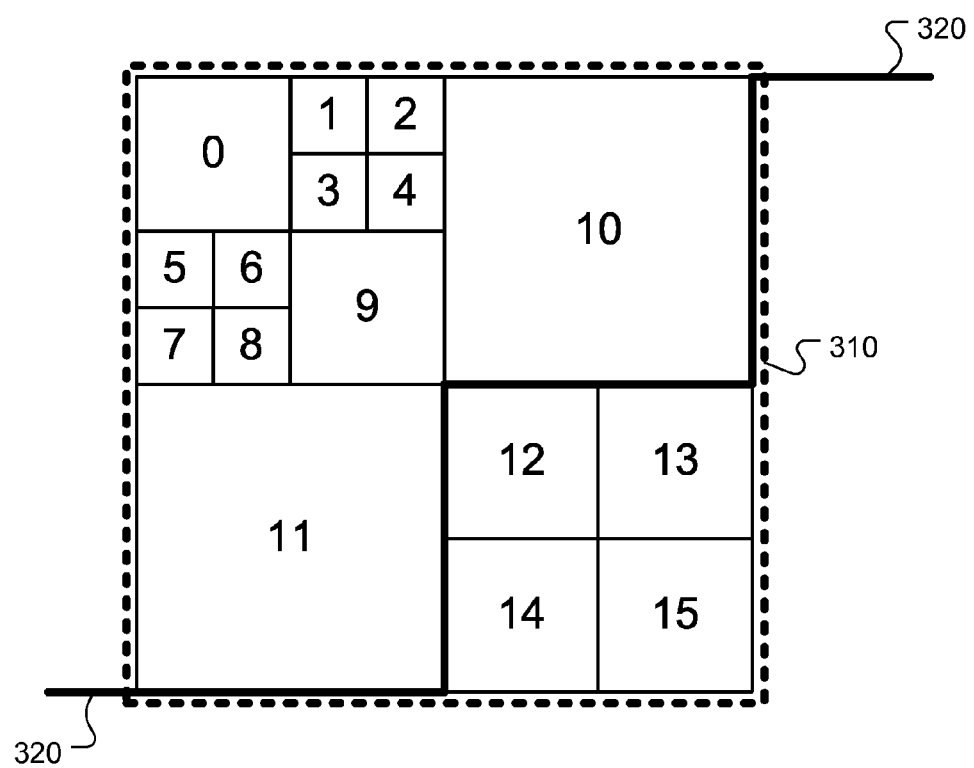
FIG. 3 illustrates an example of slice boundary zigzagging through the largest coding unit.

FIG. 3 illustrates an example of slice boundary zigzagging through the largest coding unit. The LCU is highlighted by the dashed line 310 and the LCU is divided into leaf CUs of various sizes according to the quadtree. A total of sixteen leaf CUs are generated and the leaf CUs are numbered from 0 through 15, where the leaf CU indexing is according to the depth-first quadtree scan order. The slice partition can be terminated at any leaf CU of the LCU. The slice boundary 320 partitions the LCU into two parts, where leaf CUs 0 through 11 belong to one slice and leaf CUs 12 through 15 belong to another slice. In other words, the LCU can be split at any point of the indexed leaf CUs into two parts. For example, leaf CU 0 may belong to one slice and leaf CUs 1 through 15 may belong to another slice, or leaf CUs 0 through 8 may belong to one slice and leaf CUs 9 through 15 may belong to another slice. The non-LCU-aligned slice partition clearly provides more flexibility and granularity than the LCU-aligned approach.

Figure 4:
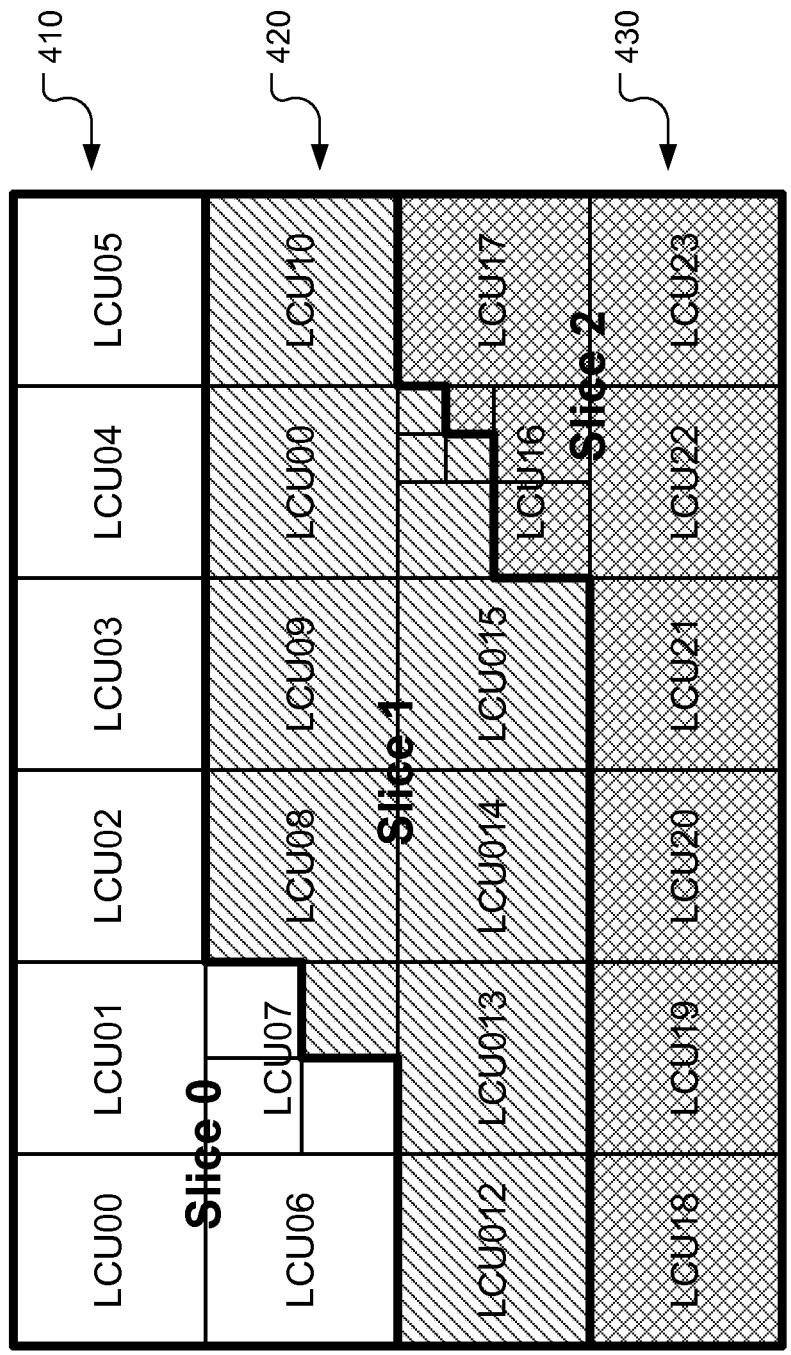
FIG. 4 illustrates an example of slice partition where the slice includes fractional LCUs.

FIG. 4 illustrates an example of slice structure embodying the fractional LCU partition, where the partition boundaries are finer than the largest coding unit. Slice 0, 410 includes LCU00 through LCU06 and terminates at a leaf CU of LCU07. LCU07 is split between slice 0, 410 and slice 1, 420. Slice 1, 420 includes the remaining leaf CUs of LCU07 not included in slice 0, 410 and LCU08 through LCU15, and part of LCU16. Slice 1, 420 terminates at a leaf CU of LCU16. LCU16 is split between slice 1, 420 and slice 2, 430. Slice 2, 430 includes the remaining leaf CUs of LCU16 not included in slice 1, 420 and LCU17 through LCU23.

Figure 5:
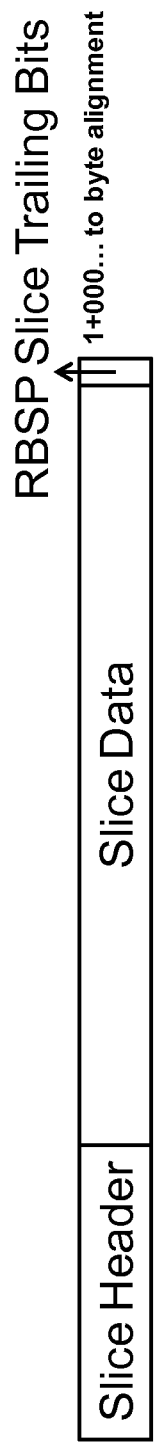
FIG. 5 illustrates a slice layer data structure comprising a slice header, slice data and Raw Byte Sequence Payload (RBSP) slice trailing bits as defined in H.264

In the H.264 standard, a slice always contains an integer number of macroblocks. A slice-layer data structure, called "Slice layer without partitioning RBSP syntax" is defined, where the slice layer data structure comprises a slice header, slice data and RBSP (Raw Byte Sequence Payload) slice trailing bits as shown in FIG. 5. The slice header comprises information associated with the slice, such as the coordinate of the first macroblock in the slice, the slice type, picture parameter set, and etc. The slice data comprises a number of macroblock layer data. The H.264 standard supports two different types of entropy coding: CABAC (Context-based Adaptive Binary Arithmetic Coding) and CAVLC (Context-based Adaptive Variable Length Coding). Due to the characteristic of CABAC, a CABAC decoder is not able to determine the last syntax element of the slice unless an indication is provided. Therefore, when CABAC is used as signaled by entropy_coding_mode_flag=1, the end_of_slice_flag is used at the end of each macroblock to indicate if the current macroblock is the last macroblock in the slice. However, if CAVLC is used, end_of_slice_flag is not required because the decoder can identify the end of slice by searching for the "RBSP stop one bit" in the RBSP slice trailing bits. For the LCU-aligned slice structure, the HEVC may adopt similar slice layer data structure as that for H.264, where the LCU is treated in a way similar to a macroblock. However, when the flexible slice structure as shown in FIG. 4 is used, there is a need for a method to properly and efficiently communicate information related to the flexible slice structure between an encoder and a decoder. Accordingly, new syntax is developed for sequence parameter set, slice header, slice data, and CU layer data.

FIG. 6 illustrates an exemplary sequence parameter set syntax associated with the flexible slice boundary. A new flag, lcu_aligned_slice_flag, is defined where a value 0 implies slice boundaries not aligned with LCUs, and a value 1 implies slice boundaries aligned with LCUs. Therefore, the use of lcu_aligned_slice_flag allows the slice structure to be either LCU-aligned or non-LCU-aligned. The choice can be conveyed efficiently between an encoder and a decoder by incorporating lcu_aligned_slice_flag in the bitstream. Another new flag, send_num_lcu_flag, is also defined where a value 0 implies the use of end_of_slice_flag for CABAC and a value 1 implies no end_of_slice_flag used for CABAC. The use of send_num_lcu_flag allows the system to either use end_of_slice_flag or other mechanism to convey slice termination information. In addition, a syntax element, eos_max_depth_minus1, is defined which specifies the maximum quadtree depth minus 1 for the LCU corresponding to the end of slice (eos). The eos_max_depth_minus1 is used to derive the minimum CU size for the eos, EosMinCuSize. A leaf CU having a size the same as or larger than the minimum CU size for the eos will has its own end_of_slice_flag. On the other hand, if the leaf CUs are within a block having the minimum CU size for the eos, the leaf CUs will share one end_of_slice_flag in the bitstream. The incorporation of lcu_aligned_slice_flag provides the flexibility to use the LCU-aligned slice structure similar to the H.264 standard, or the flexible slice structure as described in FIG. 3 and FIG. 4. The syntax in the sequence parameter set as described above enables the conveyance of flexible slice structure in the sequence layer. While the syntax in FIG. 6 illustrates an example to convey the choices for flexible slice structure in the sequence parameter set, a skilled person in the field may also practice the present invention by using other syntax to convey similar information related to the choices for flexible slice structure. While FIG. 6 illustrates an example of incorporating lcu_aligned_slice_flag in Sequence Parameter Set (SPS), the flag may also be incorporated in Picture Parameter Set (PPS). In this disclosure, both SPS and PPS are considered to be sequence level data. Therefore, sequence level may refer to SPS or PPS.

FIG. 7 illustrates an exemplary slice header syntax associated with the flexible slice boundary. If slices are not aligned with LCUs, each slice can be started at any SCU as indicated by the new syntax elements: first_lcu_in_slice and first_scu_in_first_lcu, where first_lcu_in_slice refers to the address of the first LCU of the slice and first_scu_in_first_lcu refers to the index for the first SCU in the first LCU of the slice. A depth-first indexing of the SCU is shown in FIG. 11. The use of first_scu_in_first_lcu allows the system to identify the coordinate of the first leaf CU of the first LCU when non-LCU-aligned slice structure is used. If CABAC is used and end_of_slice_flag is not used, additional syntax elements, num_lcu_in_slice_minus1 and num_scu_in_last_lcu_minus1, are used. The num_lcu_in_slice_minus1 refers to the number of LCUs in the slice minus 1 and the num_scu_in_last_lcu_minus1 refers to the number of SCUs in the last LCU of the slice minus 1. For LCU-aligned slice structure, num_lcu_in_slice_minus1 along with first_lcu_in_slice is sufficient to determine the address of the last LCU. The syntax design according to the present invention uses num_lcu_in_slice_minus1 and num_scu_in_last_lcu_minus1 to determine the structure of the last LCU in the slice. The use of num_scu_in_last_lcu_minus1 allows the system to convey the coordinate of the last leaf CU in the last LCU for the case of non-LCU-aligned slice without relying on the use of CAVLC and end_of_slice_flag. Accordingly, the syntax disclosed in FIG. 7 enables the conveyance of flexible slice structure in the slice header. Again, while the syntax in FIG. 7 illustrates an example to convey the choices for flexible slice structure in the slice header, a skilled person in the field may also practice the present invention by using other syntax to convey similar information related to the choices for flexible slice structure.

FIG. 8 illustrates an exemplary slice data syntax associated with the flexible slice boundary. When both send_num_lcu_flag has a value 0 and lcu_aligned_slice_flag has a value 0, a new flag, last_lcu_possible_flag, is used in the slice data. The incorporation of the last_lcu_possible_flag flag provides another efficient mechanism to convey the flexible slice structure associated with the last LCU in the slice for the non-LCU-aligned and end_of_slice_flag allowed case. The use of last_lcu_possible_flag can relieve the need to process the non-last LCUs for slice termination. An exemplary use of last_lcu_possible_flag will be described later in sections associated with FIGS. 15A-E. FIGS. 9A-C illustrate an exemplary coding unit data syntax associated with the flexible slice structure. The end_of_slice_flag is used in the CU-layer data in two conditions. The first condition corresponds to the case where entropy_coding_mode_flag=1 (i.e., CABAC is used), lcu_aligned_slice_flag=1 (i.e., LCU-aligned slice), and send_num_lcu_flag=0 (i.e., using end_of_slice_flag). The second condition corresponds to the case where entropy_coding_mode_flag=1, lcu_aligned_slice_flag=0 (i.e., non-LCU-aligned slice), send_num_lcu_flag=0, last_lcu_possible_flag=1, and CurrCuSize>=EosMinCuSize, where CurrCuSize refers to the current CU size. The syntax disclosed in FIG. 8 and FIGS. 9A-C along with the syntax disclosed in FIG. 6 and FIG. 7 enables proper and efficient conveyance of the flexible slice structure. Further examples of use cases will be described in details in the following sections and the advantages of the present invention will be clearly appreciated.

Using the new syntax described above, the flexible slice structure can be properly and efficiently conveyed between an encoder and a decoder. FIG. 10 illustrates all combinations related to CABAC, LCU alignment, and end_of_slice_flag for syntax design considerations. As shown in FIG. 10, there are a total of 8 possible combinations, where F means false and T means true. However, two cases, case 2 and case 4, are not valid since end_of_slice_flag is not required for CAVLC (i.e., CABAC is false). The syntax usage for each of the valid cases will be described as follows.

FIG. 11 illustrates the indexing of SCUs of a largest coding unit according to the depth-first quadtree scan order, where the depth of the quadtree is 3. The three-round quadtree partition results in a total of 64 SCUs. The SCU indexing of the LCU will be used in the following description of syntax usage for various cases.

Figure 12:
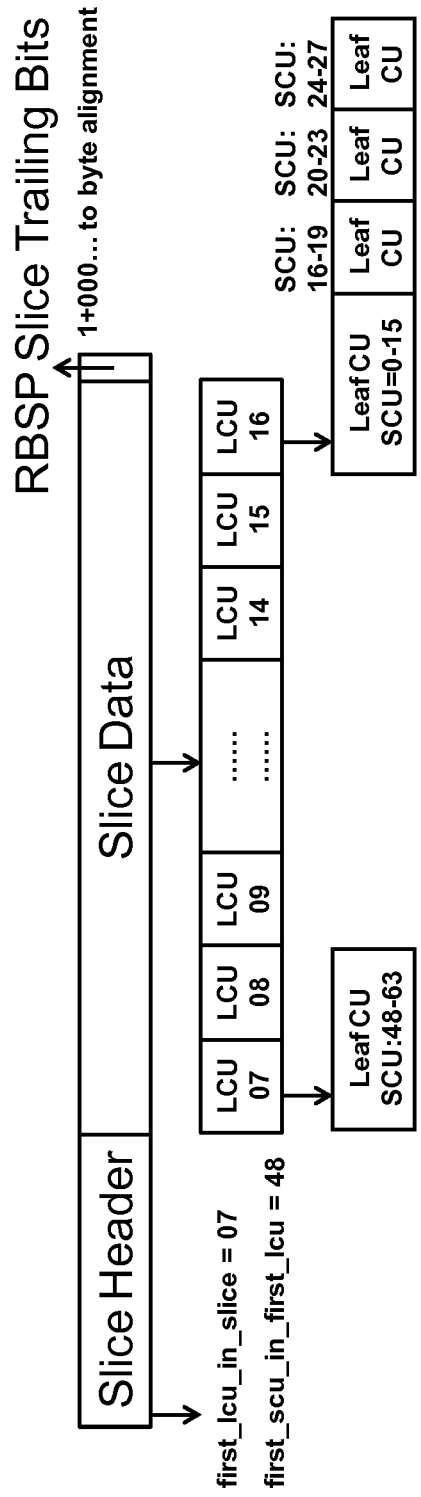
FIG. 12 illustrates an exemplary syntax design for slice-layer data corresponding to the case of no CABAC, non-LCU-aligned and no end_of_slice_flag.

FIG. 12 illustrates an exemplary syntax design for slice 1, 420 of FIG. 4 corresponding to the case of no CABAC, non-LCU-aligned and no end_of_slice_flag (case 1). As shown in FIG. 4, slice 1, 420 covers LCU07 through LCU16. As mentioned before, the location of the first LCU in the slice can be identified by first_lcu_in_slice and the first leaf CU is identified by first_scu_in_first_lcu. The index for the first SCU according to the SCU indexing of FIG. 11 has a value of 48. Accordingly, first_lcu_in_slice=07 and first_scu_in_first_lcu=48 are carried in the slice header to signal the location of the first leaf CU in the first LCU of the slice. The last LCU contains four leaf CUs as shown in FIG. 12. Since CABAC is not used, the CAVLC is able to determine the end_of the slice in the last LCU by detecting the "1" in the RBSP slice trailing bits without the use of end_of_slice_flag.

Figure 13:
FIG. 13 illustrates an exemplary syntax design for slice-layer data corresponding to the case no CABAC, LCU-aligned and no end_of_slice_flag.

FIG. 13 illustrates an exemplary syntax design for slice 1, 220 of FIG. 2 corresponding to the case of no CABAC, LCU-aligned and no end_of_slice_flag (case 3). As shown in FIG. 2, slice 1, 220 covers LCU08 through LCU15. This case is similar to the conventional macroblock-based slice structure of H.264. Only the first LCU in the slice needs to be identified. Since the LCU is not further partitioned into different slices, there is no need to identify the first SCU in the first LCU. Accordingly, only first_lcu_in_slice=08 is carried in the slice header to signal the location of the first LCU of the slice. Again, since CABAC is not used, the CAVLC is able to determine the end of the slice in the last LCU by detecting the "1" in the RBSP slice trailing bits without the use of end_of_slice_flag.

Figure 14:
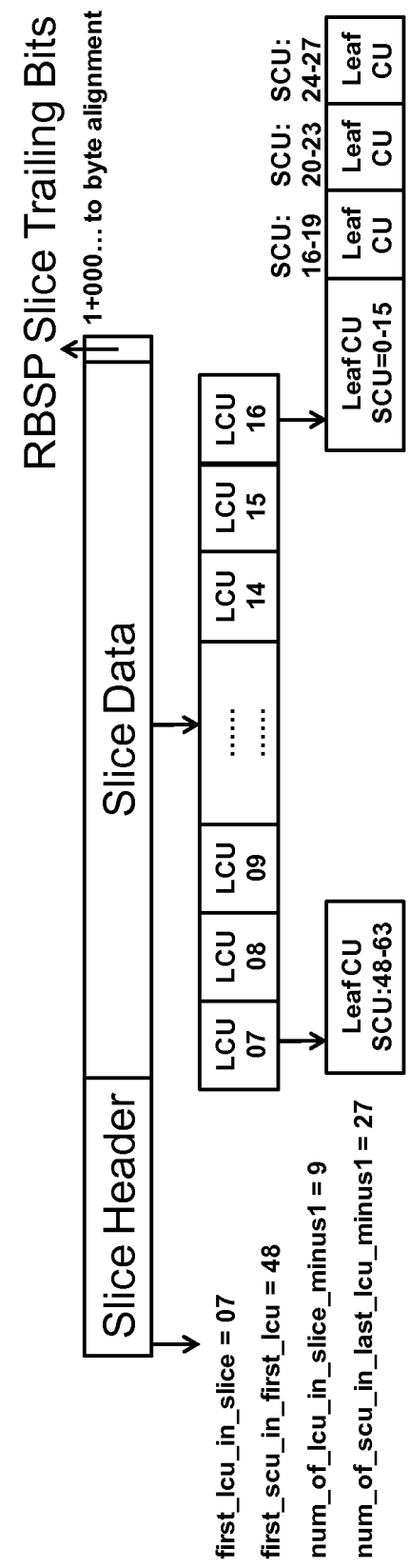
FIG. 14 illustrates an exemplary syntax design for slice-layer data corresponding to the case of using CABAC, non-LCU-aligned and no end_of_slice_flag.

FIG. 14 illustrates an exemplary syntax design for slice 1, 420 of FIG. 4 corresponding to the case of CABAC enabled, non-LCU-aligned and no end_of_slice_flag (case 5). As shown in FIG. 4, slice 1, 420 covers LCU07 through LCU16. Since non-LCU alignment is used, the information of the first SCU in the first LCU is carried using the syntax elements first_lcu_in_slice and first_scu_in_first_lcu as described for case 1 in FIG. 12. Since CABAC is used, there is a need to provide a mechanism to identify the last syntax element of the last CU in the slice. Since end_of_slice_flag is not used, the syntax elements num_lcu_in_slice_minus1 and num_scu_in_last_lcu_minus1 are used to convey the necessary information. Slice 1, 420 contains 10 LCU and the last LCU contains 28 SCUs (0-15, 16-19, 20-23, and 24-27), the syntax elements num_lcu_in_slice_minus1=9 and num_scu_in_last_lcu_minus1=27 are carried in the slice header to convey the structure of the last LCU. A decoder can determine the coordinate of the last leaf CU in the last LCU based on num_lcu_in_slice_minus1 and num_scu_in_last_lcu_minus1.

Figure 15A:
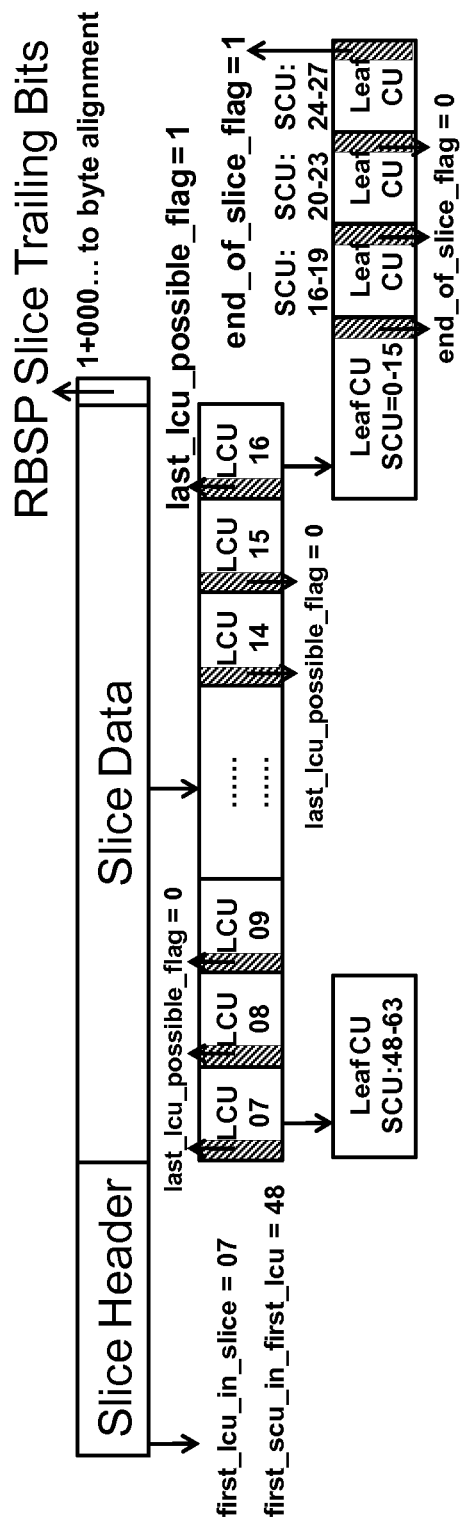
FIG. 15A illustrates an exemplary syntax design for slice-layer data corresponding to the case of using CABAC, non-LCU-aligned and using end_of_slice_flag.

FIG. 15A illustrates an exemplary syntax design for slice 1, 420 of FIG. 4 corresponding to the case of CABAC enabled, non-LCU-aligned and using end_of_slice_flag (case 6, variation A). Since CABAC is used, there is a need to provide a mechanism to identify the last syntax element of the last CU in the slice. There are several alternatives to facilitate the mechanism to identify the last syntax element of the last CU in the slice. Since non-LCU alignment is used, the information of the first SCU in the first LCU is carried using the syntax elements first_lcu_in_slice and first_scu_in_first_lcu as described for case 1 in FIG. 12. In order to convey information related to the structure of the last LCU, the last_lcu_possible_flag flag and the end_of_slice_flag flag are used as shown in FIG. 15A. The value of last_lcu_possible_flag is set to 0 for every LCU except for the last LCU in the slice. For the last LCU, last_lcu_possible_flag has a value of 1 to indicate the occurrence of the last LCU. Furthermore, each leaf CU in the last LCU contains an end_of_slice_flag flag to signal whether it is the last CU. Accordingly, the leaf CUs associated with SCUs 0-15, SCUs 16-19, and SCUs 20-23 have end_of_slice_flag value of 0 and the leaf CU associated with SCU 24-27 has end_of_slice_flag value of 1. A decoder will be able to determine the last leaf CU in the last LCU based on the LCU with last_lcu_possible_flag=1 and the leaf CU with end_of_slice_flag=1.

Figure 15C:
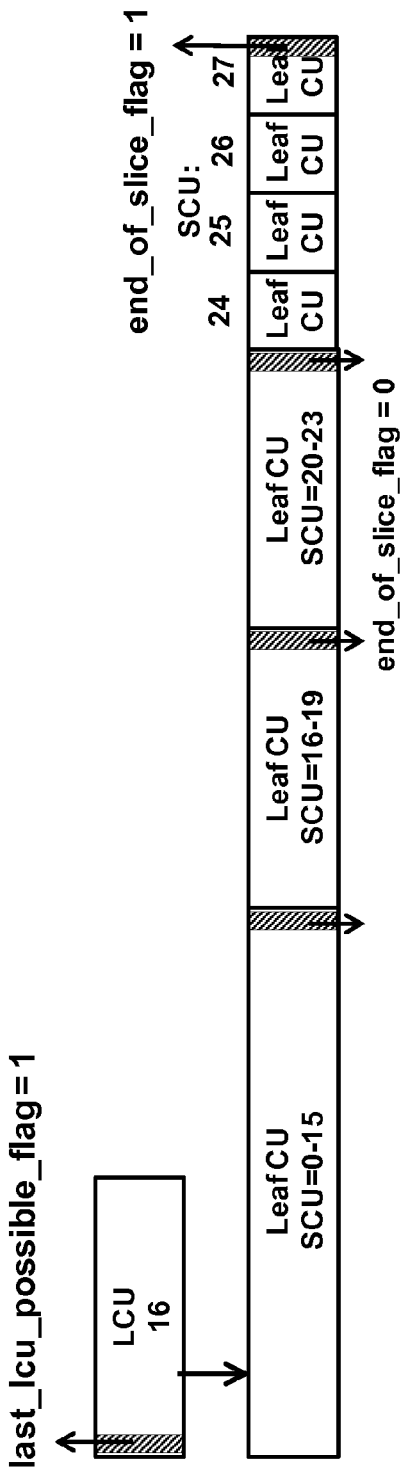
FIG. 15C illustrates an exemplary syntax design for the last LCU of FIG. 15A, where leaf CUs 24-27 share a same end_of_slice_flag since leaf CUs 24-27 are smaller than the minimum CU size for the end of slice.
Figure 15D:
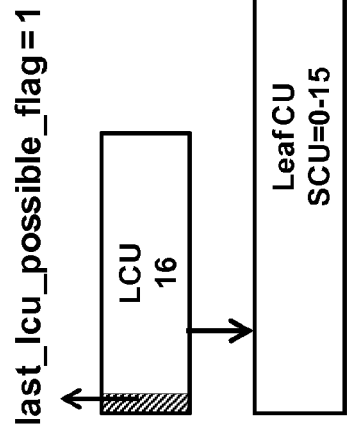
FIG. 15D illustrates an exemplary syntax design for last LCU of FIG. 15A, where every leaf CU in LCU16 including each of leaf CUs 24-27 has its own end_of_slice_flag.

There is a minimum CU size for the eos as indicated by EosMinCuSize for the slice to terminate, and the minimum CU size for the eos, EosMinCuSize may be larger than the smallest leaf CU size in the last LCU. In this case, all leaf CUs belonging to a CU with a size equal to EosMinCuSize will share the same end_of_slice_flag. The syntax eos_max_depth_minus1 will be used in the sequence parameter set to indicate the minimum CU size for the eos, EosMinCuSize. The use of syntax eos_max_depth_minus1 allows EosMinCuSize to be determined. With EosMinCuSize known, the method can reduce the information to be transmitted by sharing end_of_slice_flag among leaf CUs belonging to the CU having a size of EosMinCuSize. Alternatively, the method can be simplified by not sharing end_of_slice_flag among leaf CUs belonging to a CU having a size of EosMinCuSize. In this case, end_of_slice_flag will be used in each leaf CU in the last LCU regardless of its size. In order to illustrate the difference in resulted data stream between sharing the end_of_slice_flag flag and having individual end_of_slice_flag flags, the partition of the last LCU of slice 1, 420 in FIG. 4 is modified, where the leaf CU covering SCUs 24-27 is further partitioned into four leaf CUs corresponding to SCUs 24-27 respectively, as shown in FIG. 15B. Leaf CUs 24-27 has a size of 8×8 each. EosMinCuSize is set to 16×16 as an example to illustrate the scenario. Leaf CUs 24-27 are smaller than EosMinCuSize. When the syntax eos_max_depth_minus1 is used, EosMinCuSize can be determined so that the condition of leaf CUs 24-27 each being smaller than EosMinCuSize can be determined. Accordingly, these four leaf CUs can share same end_of_slice_flag as shown in FIG. 15C. Alternatively, the method transmit end_of_slice_flag in each leaf CUs in the last LCU regardless its size and there is no need to carry eos_max_depth_minus1 in the sequence parameter set, as shown in FIG. 15D.

Figure 15E:
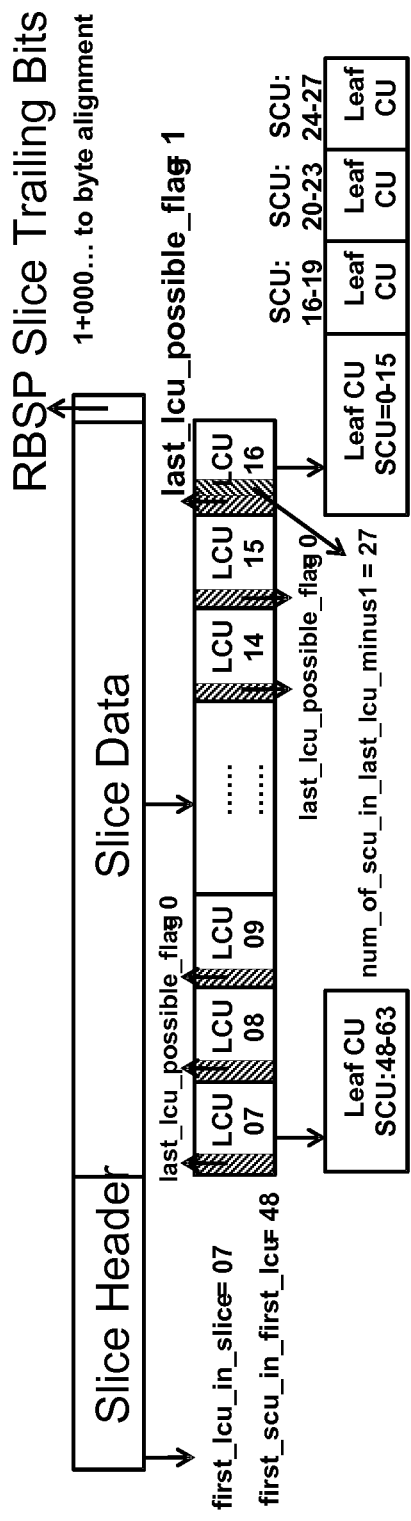
FIG. 15E illustrates an alternative syntax design for slice-layer data corresponding to the case of using CABAC, non-LCU-aligned and using end_of_slice_flag, where num_of_s-cu_in_last_lcu_minus1 is incorporated into the last LCU so that there is no need to incorporate end_of_slice_flag into leaf CUs of the last LCU.

FIG. 15E illustrates another exemplary syntax design for slice 1, 420 of FIG. 4 corresponding to the case of CABAC enabled, non-LCU-aligned and using end_of_slice_flag (case 6, variation B). Instead of incorporating end_of_slice_flag with each leaf CU in the last LCU as shown in FIG. 15A, the syntax num_scu_in_last_lcu_minus1 can be incorporated with the last LCU to convey the information regarding the structure of the last LCU, i.e., the number of SCUs in the last LCU. In this case, there is no need to transmit eos_max_depth_minus1 in the sequence parameter set. The decoder will be able to determine the structure of the last LCU by identifying an LCU with last_lcu_possible_flag=1 and extract the number of SCUs in the last LCU from num_s-cu_in_last_lcu_minus1.

Figure 16:
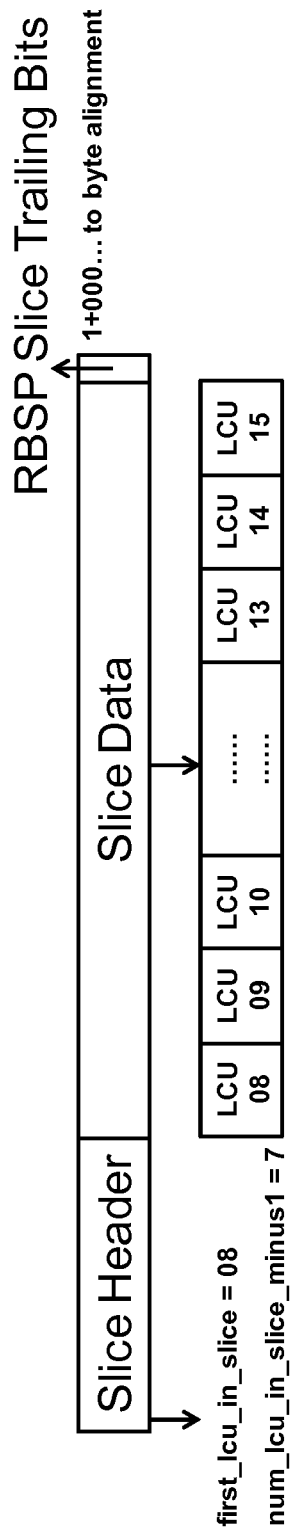
FIG. 16 illustrates an exemplary syntax design for slice-layer data corresponding to the case of using CABAC, LCU-aligned and no end_of_slice_flag.

FIG. 16 illustrates an exemplary syntax design for slice 1, 220 of FIG. 2 corresponding to the case of CABAC enabled, LCU-aligned and no end_of_slice_flag (case 7). The syntax first_lcu_in_slice is used to indicate the first LCU in the slice and the syntax num_lcu_in_slice_minus1 is used to convey information regarding the total number of LCUs in the slice.

Figure 17:
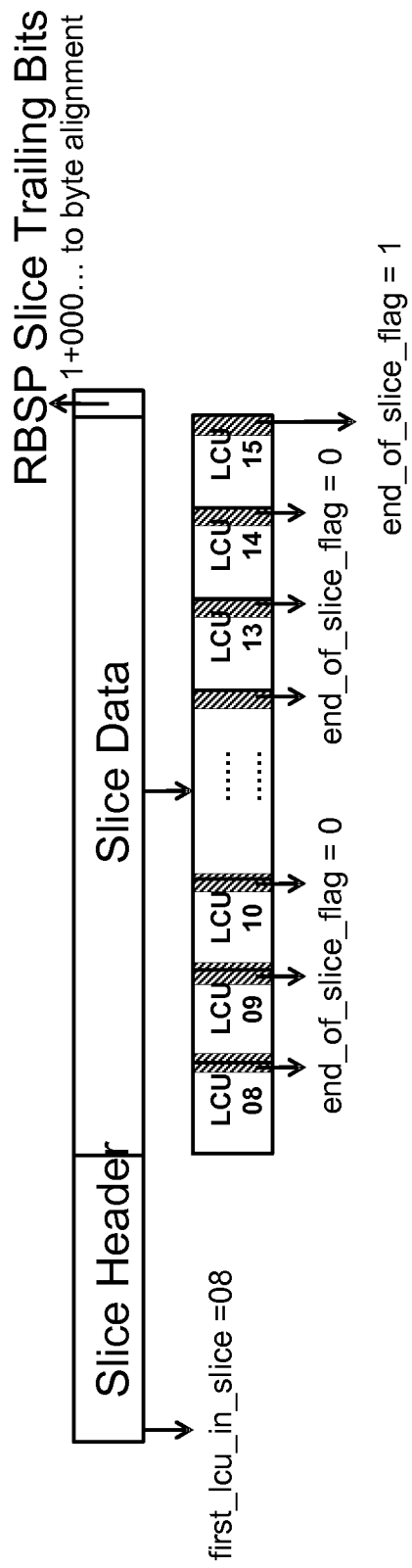
FIG. 17 illustrates an exemplary syntax design for slice-layer data corresponding to the case of using CABAC, LCU-aligned and using end_of_slice_flag.

FIG. 17 illustrates an exemplary syntax design for slice 1, 220 of FIG. 2 corresponding to the case of CABAC enabled, LCU-aligned and using end_of_slice_flag (case 8). This case is similar to the conventional macroblock-based slice structure of H.264 with CABAC enabled. The syntax end_of_s-lice_flag is used to convey information regarding the last LCU in the slice.

Based on the above description, a flexible slice structure that allows the slice boundaries to zigzag through the first LCU and/or the last LCU according to a depth-first quadtree scan order. Also syntax necessary to convey information related to the flexible slice structure is disclosed for sequence parameter set, slice header, slice data and coding unit data. The flexible slice structure has the advantage of providing finer granularities for the coding system. The syntax disclosed enables the information conveyance regarding the flexible slice structure between an encoder and a decoder.

Figure 18:
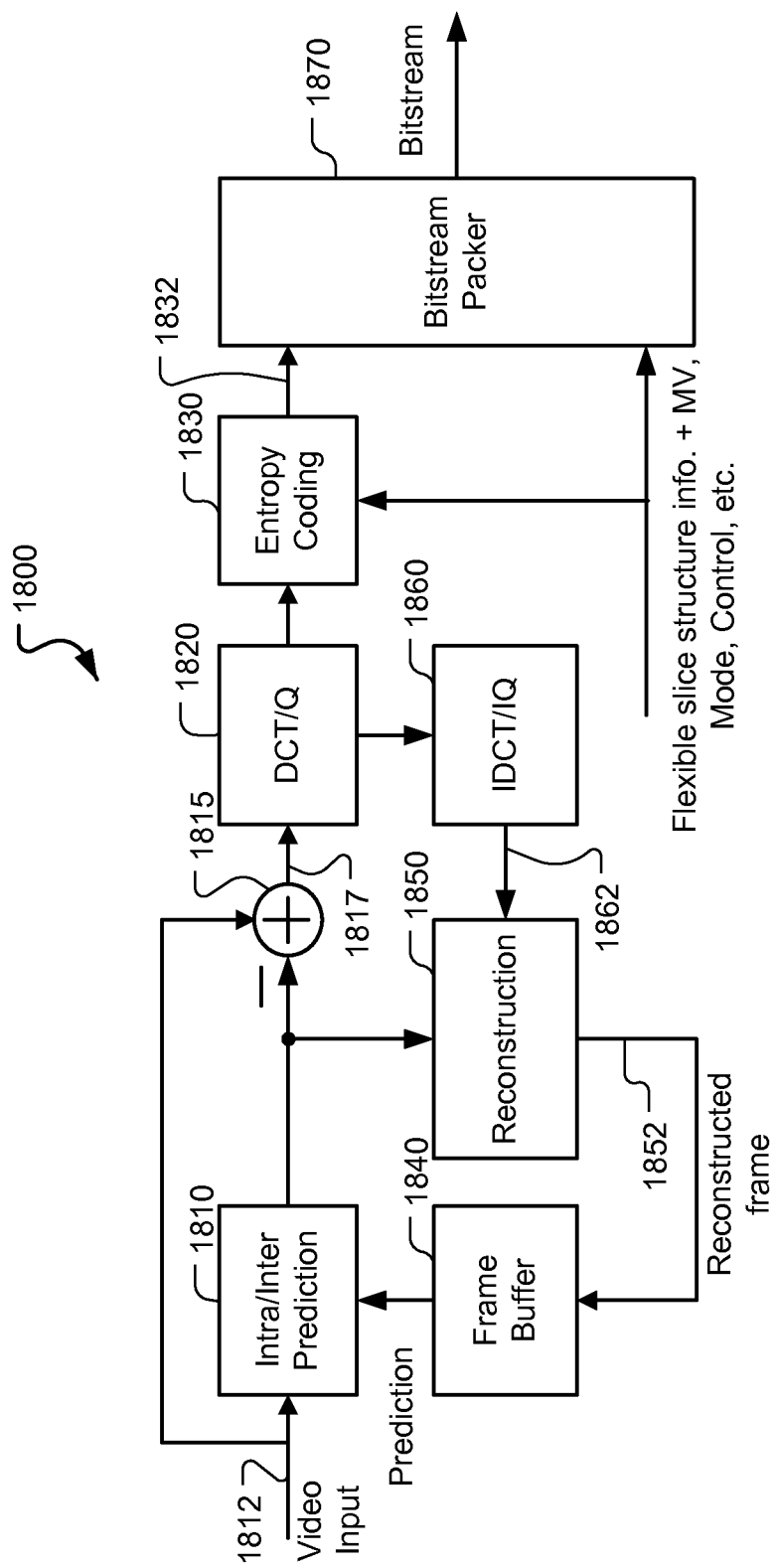
FIG. 18 illustrates a system block diagram of a video encoder embodying the flexible slice structure.

FIG. 18 illustrates a simplified system block diagram of a video encoder 1800 embodying the flexible slice structure where the video encoder utilizes intra/inter-prediction, Discrete Cosine Transform (DCT) and entropy coding. The video input data 1812 is processed by intra/inter prediction 1810 to remove spatial-temporal redundancy. The residual video data 1817 is then subject to DCT and quantization (DCT/Q) 1820 and entropy coding 1830. The inter prediction can be a forward prediction mode, where the prediction is based on a picture prior to the current picture. The inter prediction may also be a backward prediction mode where the inter prediction is based on a picture after the current picture. The inter prediction may also be a combination of forward and backward prediction. In the inter-prediction mode, the intra/inter prediction 1810 will cause the prediction data to be provided to the adder 1815 and be subtracted from the original video data. In order to provide the prediction data, the prediction error processed by DCT/Q block 1820 has to be recovered by inverse DCT and inverse quantization (IDCT/IQ) 1860 to provide a reconstructed prediction error 1862. In the reconstruction block 1850, the reconstructed prediction error 1862 is added to a previously reconstructed frame in the inter prediction mode stored in frame buffer 1840 to form a currently reconstructed frame 1852. In the intra prediction mode, the reconstructed prediction error 1862 is added to the previously reconstructed surrounding data in the same frame stored in frame buffer 1840 to form the currently reconstructed frame 1852. Intra/inter prediction block 1810 is configured to route the reconstructed data stored in frame buffer 1840 to reconstruction block 1850, where the reconstructed data may correspond to reconstructed previous frame or reconstructed surrounding data in the same frame depending on the inter/intra mode. In advanced video compression systems, reconstruction block 1850 not only reconstruct a frame based on the reconstructed prediction error 1862 and previously reconstructed data, it may also perform certain processing such as deblocking and loop filtering to reduce coding artifacts. The entropy coded video data 1832 and associated information such as motion vector, coding mode, and system control information are provided to the bitstream packer 1870 to form video bitstream. Some of the associated information, such as motion vector and coding mode, is subject to entropy coding and these pieces of information will be processed by entropy coding 1830 before it is provided to the bitstream packer 1870. The information corresponding to the syntax elements associated with the flexible slice structure will be provided to bitstream packer 1870 for incorporation into the bitstream. The information corresponding to the syntax elements associated with the flexible slice structure may be provided by a controller or a processor responsible for overall system operation or may be provided by a controller or a processor associated with slice layer processing. For example, the information regarding the first LCU, such as first_lcu_in_slice and first_scu_in_first_lcu may be provided by a controller or processor associated with slice processing. The controller or processor to provide the needed information is not shown in FIG. 18. Nevertheless, it is well known to a skilled person in the art to use a controller or a processor to provide the needed information to the bitstream packer 1870. While FIG. 18 illustrates one exemplary video encoder embodying the flexible slice structure, other system architect may also be used to practice video coding using the flexible slice structure.

Figure 19:
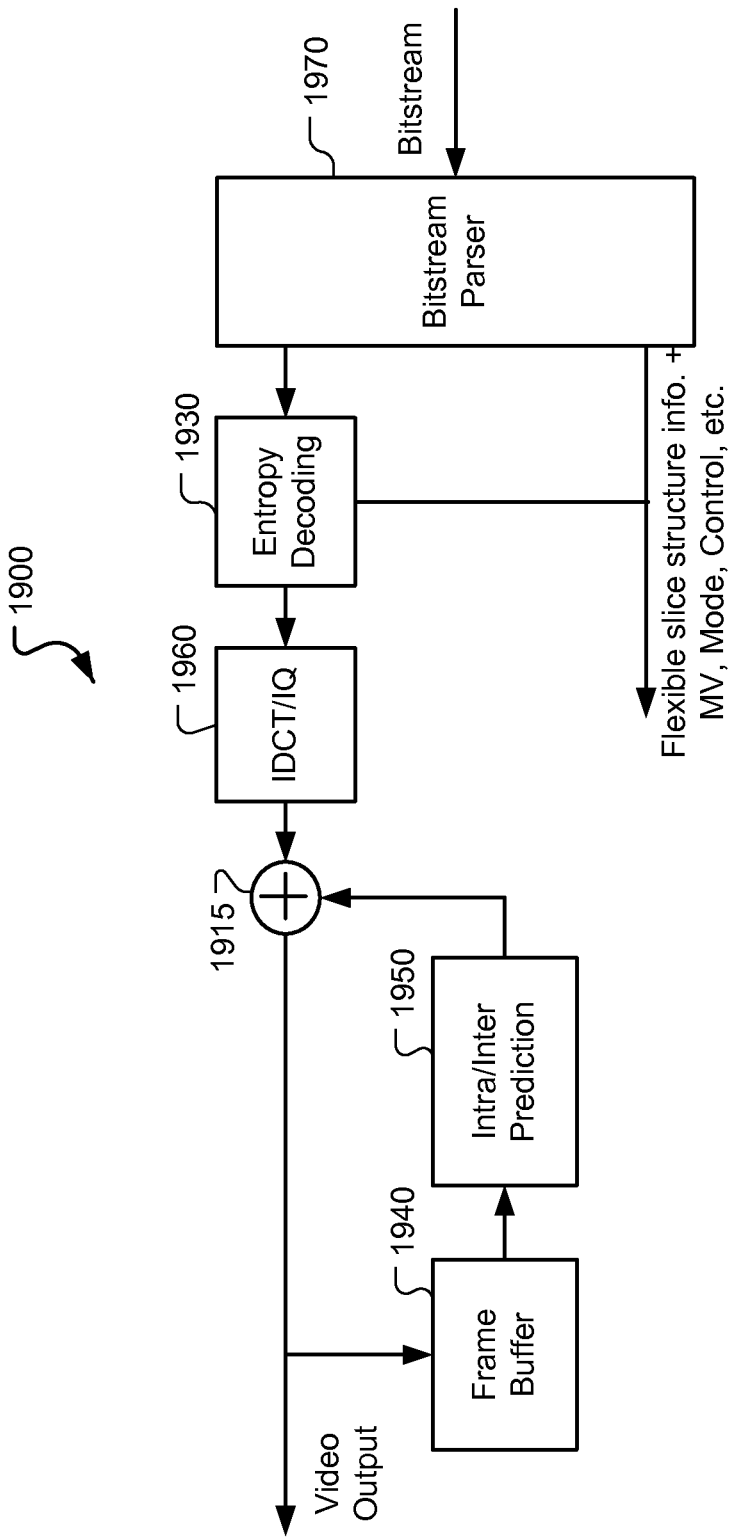
FIG. 19 illustrates a system block diagram of a video decoder embodying the flexible slice structure.

FIG. 19 illustrates a system block diagram of a video decoder 1900 embodying the flexible slice structure. The bitstream parser 1970 parses the bitstream to separate the syntax elements. The entropy coded data is routed to entropy decoding 1930 to recover coded symbols. Information associated with flexible slice structure will be provided by the bitstream parser 1970. If the associated syntax element is entropy coded, it will be decoded by the entropy decoder 1930. The entropy decoded data is then processed by inverse DCT and inverse quantization (IDCT/IQ) 1960 to recover video data. The recovered video data may represent inter/intra-prediction residual information and will be reconstructed by the reconstruction loop consisting of frame buffer 1940, intra/inter prediction 1950 and adder 1915. The decoder may include in-loop filter or post processing, which are not shown, to improve quality. The information provided by the bitstream parser 1970 regarding the flexible slice structure will be used by the decoder to properly identify the structure of the flexible slice. While FIG. 19 illustrates one exemplary video decoder embodying the flexible slice structure, other system configuration may also be used to practice the flexible slice structure.

The invention may be embodied in other specific forms without departing from its spirit or essential characteristics. The invention may be embodied in hardware such as integrated circuits (IC) and application specific IC (ASIC), software and firmware codes associated with a processor implementing certain functions and tasks of the present invention, or a combination of hardware and software/firmware. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for video coding, the method comprising:
   partitioning video input data into largest coding units (LCUs);
   configuring a slice to include a plurality of LCUs, having a first LCU and a last LCU; wherein the first LCU and the last LCU are selected from a group consisting of a fractional LCU and a whole LCU and wherein the fractional LCU is formed by partitioning the whole LCU into leaf CUs according to a quadtree;
   applying video coding to the slice to generate compressed video data for the slice;
   generating a slice layer bitstream comprising the compressed video data for the slice, further comprising:
      incorporating first information at a sequence level, wherein the first information indicates minimum CU size required for a leaf CU in the last LCU to incorporate an end of slice flag;
      incorporating a first flag in each of the LCUs in the slice to indicate possibility of being the last LCU in the slice;
      incorporating the end of slice flag in the leaf CU of the last LCU indicated by the first flag if the leaf CU is same or larger than the minimum CU size for the end of slice; and
      incorporating the end of slice flag for sharing by the leaf CUs of the last LCU indicated by the first flag, wherein the leaf CUs sharing the end of slice flag are within a block having the minimum CU size for the end of slice; and
   generating a video bitstream comprising the slice layer bitstream.

2. The method of claim 1, wherein the step of generating video bitstream further comprising a step of incorporating a first flag at a sequence level to indicate whether slice boundaries are LCU-aligned or non-LCU aligned.

3. The method of claim 1, wherein the step of generating video bitstream further comprising a step of incorporating a first flag at a sequence level to indicate whether an end_of_slice_flag is used for context-based adaptive binary arithmetic coding (CABAC).

4. The method of claim 1, wherein the step of generating video bitstream further comprising a step of incorporating first information at a sequence level, wherein the first information indicates minimum CU size required for leaf coding units (CUs) in the last LCU to incorporate an end_of_slice_flag, and wherein the end_of_slice_flag enables the slice to terminate at a last leaf CU in the last LCU by asserting the end_of_slice_flag in the last leaf CU in the last LCU.

5. A method for video decoding, the method comprising:
   receiving a video bitstream comprising a slice layer bitstream;
   extracting an alignment flag from the video bitstream to determine whether a slice associated with the slice layer bitstream is largest coding unit (LCU) aligned or non-LCU-aligned, wherein the slice comprises a group of LCUs having a first LCU and a last LCU; and
   decoding the slice layer bitstream to provide the slice, wherein said decoding the slice layer bitstream comprises a step of deriving slice structure information in the video bitstream to determine slice boundaries, wherein the step of deriving slice structure information further comprising:
      extracting first information at a sequence level to determine minimum CU size required for a leaf CU in the last LCU to incorporate an end of slice flag;
      extracting a first flag in each of the group of LCUs to determine possibility of being the last LCU in the slice;
      extracting the end of slice flag in the leaf CU of the last LCU indicated by the first flag if the leaf CU is same or larger than the minimum CU size for the end of slice; and
      extracting the end of slice flag for the leaf CUs of the last LCU indicated by the first flag, wherein the leaf Cus within a block having the minimum CU size for the end of slice share the end_of_slice_flag.

6. The method of claim 5, wherein the step of deriving slice structure information further comprising a step of extracting a first flag at a sequence level to determine whether the end_of_slice_flag is used for context-based adaptive binary arithmetic coding (CABAC).

7. The method of claim 5, wherein the end_of_slice_flag is used to determine slice termination according to a value of the end_of_slice_flag in the leaf CU of the last LCU.

8. An apparatus for video coding, the apparatus comprising:
   means for partitioning video input data into largest coding units (LCUs);
   means for configuring a slice to include a plurality of LCUs, having a first LCU and a last LCU; wherein the first LCU and the last LCU are selected from a group consisting of a fractional LCU and a whole LCU and wherein the fractional LCU is formed by partitioning the whole LCU into leaf CUs according to a quadtree;
   a video encoder module to generate compressed video data for the slice;
   means for generating a slice layer bitstream comprising the compressed video data for the slice, wherein the means for generating a slice layer bitstream further comprising:
      means for sending first information at a sequence level to indicate minimum CU size required for a leaf coding unit (CU) in the last LCU to incorporate an end_of_slice_flag;
      means for sending a first flag in each of the LCUs in the slice to indicate possibility of being the last LCU in the slice;
      means for sending the end of slice flag in the leaf CU of the last LCU indicated by the first flag if the leaf CU is same or larger than the minimum CU size for the end of slice; and
      means for sending the end_of_slice_flag for the leaf CUs of the last LCU indicated by the first flag, wherein the leaf CUs within a block having the minimum CU size for the end of slice share the end of slice flag; and
   means for generating a video bitstream comprising the slice layer bitstream.

9. The apparatus of claim 8, wherein the means for generating a slice layer bitstream further comprising means for sending a second flag at the sequence level to indicate whether the end_of_slice_flag is used for context-based adaptive binary arithmetic coding.

10. The apparatus of claim 8, wherein the end_of_slice_flag is used to indicate slice termination according to a value of the end_of_slice_flag in the leaf CU of the last LCU.

11. An apparatus for video decoding, the apparatus comprising:
means for receiving a video bitstream comprising a slice layer bitstream;
means for extracting an alignment flag from the video bitstream to determine whether a slice associated with the slice layer bitstream is largest coding unit (LCU) aligned or non-LCU-aligned, wherein the slice comprises a group of LCUs having a first LCU and a last LCU; and
a video decoder module to decode the slice layer bitstream into the slice, wherein the video decoder module comprises means for deriving slice structure information in the video bitstream to determine slice boundaries, wherein the means for deriving slice structure information further comprising:
means for extracting first information at a sequence level to determine minimum CU size required for a leaf coding unit (CU) in the last LCU to incorporate an end_of_slice_flag;
means for extracting a first flag in each of the group of LCUs to determine possibility of being the last LCU in the slice;
means for extracting the end of slice flag in the leaf CU of the last LCU indicated by the first flag if the leaf CU is same or larger than the minimum CU size for the end of slice; and
means for extracting the end of slice flag for the leaf CUs of the last LCU indicated by the first flag, wherein the leaf Cus within a block having the minimum CU size for the end of slice share the end_of_slice_flag.

12. The apparatus of claim 11, wherein the means for deriving slice structure information further comprising means for extracting a second flag at the sequence level to determine whether the end_of_slice_flag is used for context-based adaptive binary arithmetic coding.

13. The apparatus of claim 11, wherein the end_of_slice_flag is used to determine slice termination according to a value of the end_of_slice_flag in the leaf CU of the last LCU.

14. The method of claim 2, wherein the sequence level is a sequence parameter set (SPS) or a picture parameter set (PPS).

15. The method of claim 3, wherein the sequence level is a sequence parameter set (SPS) or a picture parameter set (PPS).

16. The method of claim 4, wherein the sequence level is a sequence parameter set (SPS) or a picture parameter set (PPS).

17. The method of claim 1, wherein the sequence level is a sequence parameter set (SPS) or a picture parameter set (PPS).

18. The method of claim 6, wherein the sequence level is a sequence parameter set (SPS) or a picture parameter set (PPS).

19. The method of claim 7, wherein the sequence level is a sequence parameter set (SPS) or a picture parameter set (PPS).

20. The method of claim 5, wherein the sequence level is a sequence parameter set (SPS) or a picture parameter set (PPS).

21. A method for video coding, the method comprising:
partitioning video input data into largest coding units (LCUs);
configuring a slice to include a plurality of LCUs, having a first LCU and a last LCU; wherein the first LCU and the last LCU are selected from a group consisting of a fractional LCU and a whole LCU and wherein the fractional LCU is formed by partitioning the whole LCU into leaf CUs according to a quadtree;
applying video coding to the slice to generate compressed video data for the slice;
generating a slice layer bitstream comprising the compressed video data for the slice, further comprising:
incorporating a first flag in each of the LCUs in the slice to indicate possibility of being the last LCU in the slice;
incorporating a SCU number count of smallest CUs in the last LCU and skipping an end_of_slice_flag for the last LCU indicated by the first flag; and
skipping the SCU number count and the end_of_slice_flag for LCUs other than the last LCU; and
generating a video bitstream comprising the slice layer bitstream.

22. The method of claim 21, wherein the step of generating video bitstream further comprising a step of incorporating a first flag at a sequence level to indicate whether slice boundaries are LCU-aligned or non-LCU aligned.

23. The method of claim 21, wherein the step of generating video bitstream further comprising a step of incorporating a first flag at a sequence level to indicate whether an end_of_slice_flag is used for context-based adaptive binary arithmetic coding (CABAC).

24. The method of claim 21, wherein the step of generating video bitstream further comprising a step of incorporating first information at a sequence level, wherein the first information indicates minimum CU size required for leaf coding units (CUs) in the last LCU to incorporate an end_of_slice_flag, and wherein the end_of_slice_flag enables the slice to terminate at a last leaf CU in the last LCU by asserting the end_of_slice_flag in the last leaf CU in the last LCU.

* * * * *